United States Patent
Han

(10) Patent No.: US 10,029,557 B2
(45) Date of Patent: Jul. 24, 2018

(54) HYBRID ELECTRIC VEHICLE COOLING SYSTEM WITH COOLANT AMOUNT DETECTION BETWEEN CIRCUITS

(71) Applicant: HYUNDAI MOTOR COMPANY, Seoul (KR)

(72) Inventor: Kyung-Su Han, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 269 days.

(21) Appl. No.: 14/793,616

(22) Filed: Jul. 7, 2015

(65) Prior Publication Data

US 2016/0144710 A1 May 26, 2016

(30) Foreign Application Priority Data

Nov. 26, 2014 (KR) .......................... 10-2014-0166277

(51) Int. Cl.
*F28F 27/00* (2006.01)
*B60K 11/02* (2006.01)
(Continued)

(52) U.S. Cl.
CPC ................ *B60K 11/02* (2013.01); *F01P 3/20* (2013.01); *F01P 7/165* (2013.01); *F01P 2050/24* (2013.01)

(58) Field of Classification Search
CPC ... B60K 11/02; B60K 6/20; B60K 6/48; F01P 3/20; F01P 5/14; F01P 7/165;
(Continued)

(56) References Cited

U.S. PATENT DOCUMENTS 5,070,832 A * 12/1991 Hapka ...................... F01M 1/22
                                                     123/198 D
5,094,192 A *  3/1992 Seiffert .................... F01P 3/22
                                                     123/198 DB
(Continued)

FOREIGN PATENT DOCUMENTS

JP      H10252464 A     9/1998
JP      2002-276364 A   9/2002
(Continued)

*Primary Examiner* — Travis Ruby
(74) *Attorney, Agent, or Firm* — McDermott Will & Emery LLP

(57) ABSTRACT

A hybrid electric vehicle (HEV) cooling system includes an engine cooling circuit configured to cool an engine by circulation of coolant cooled by an engine heat exchanger using an engine water pump. An engine reservoir tank is configured to temporarily store the coolant cooled by the engine heat exchanger and replenish insufficient coolant. An HEV cooling circuit is configured to cool an inverter and motor by circulation of coolant cooled by an HEV heat exchanger using an HEV water pump. An HEV reservoir tank is configured to temporarily store the coolant cooled by the HEV heat exchanger and replenish insufficient coolant. A connector (30) configured to intermittently connect the engine cooling circuit to the HEV cooling circuit. An engine coolant amount detection sensor and an HEV coolant amount detection sensor are respectively configured to detect amounts of the coolant stored in the engine and HEV reservoir tanks.

6 Claims, 5 Drawing Sheets

(51) Int. Cl.
*F01P 3/20* (2006.01)
*F01P 7/16* (2006.01)

(58) Field of Classification Search
CPC . F01P 11/029; F01P 11/16; F01P 11/18; F01P 2025/70; F01P 2031/36; F01P 2050/24
See application file for complete search history.

(56) References Cited

U.S. PATENT DOCUMENTS

| | | | |
|---|---|---|---|
| 6,298,809 B1 * | 10/2001 | Boggs | F01P 9/02 123/41.01 |
| 2006/0130779 A1 * | 6/2006 | Wei | F01P 11/029 123/41.15 |
| 2008/0251303 A1 * | 10/2008 | Rouaud | B60K 6/26 180/65.27 |
| 2012/0180898 A1 * | 7/2012 | Sullivan | F01P 11/0204 141/1 |
| 2013/0299256 A1 * | 11/2013 | Yamashita | E02F 9/2095 180/68.1 |

FOREIGN PATENT DOCUMENTS

| | | |
|---|---|---|
| JP | 2009-507717 A | 2/2009 |
| JP | 2011-098628 A | 5/2011 |
| JP | 2011-162115 A | 8/2011 |
| JP | 2013-086717 A | 5/2013 |
| KR | 10-1998-0050753 A | 9/1998 |
| KR | 10-1999-0062085 A | 7/1999 |
| KR | 10-0478531 B1 | 3/2005 |
| KR | 10-2013-0019178 A | 2/2013 |

* cited by examiner

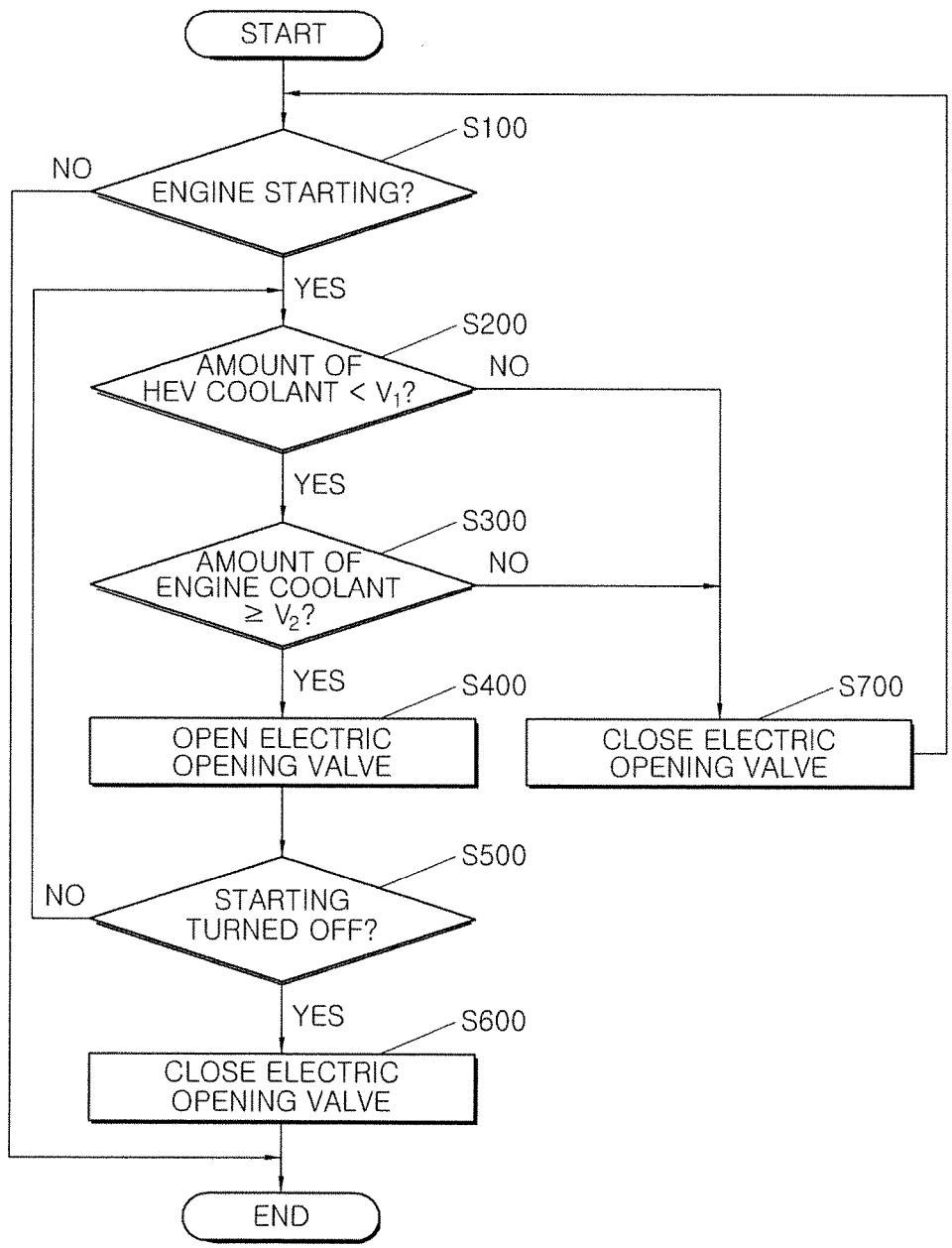

HYBRID ELECTRIC VEHICLE COOLING SYSTEM WITH COOLANT AMOUNT DETECTION BETWEEN CIRCUITS

CROSS-REFERENCE(S) TO RELATED APPLICATIONS

This application claims priority to Korean Patent Application No. 10-2014-0166277, filed on Nov. 26, 2014 which is incorporated herein by reference in its entirety.

TECHNICAL FIELD

Exemplary embodiments of the present invention relate to an HEV cooling system and a method of controlling the same; and, particularly, to an HEV cooling system which supplies coolant in an engine cooling circuit to an HEV cooling circuit such that an HEV system is not overheated when coolant is insufficient in the HEV system, and a method of controlling the same.

BACKGROUND

In recent years, an HEV (Hybrid Electric Vehicle) developed for the purpose of protection of environment and improvement of performance has come into wide use. The HEV is equipped with two drive sources such as an engine and a motor, and an inverter which converts a direct current of a secondary battery into an alternating current to supply the alternating current to the motor. In the HEV, it is necessary to cool the motor and the inverter, in addition to an existing engine cooling system. Accordingly, the conventional HEV has a cooling circuit for cooling an engine (an engine cooling circuit) and a cooling circuit for an HEV system (an HEV cooling circuit), and thus cools the engine or the HEV system by circulating coolant in the associated cooling circuit. However, since a coolant control temperature (for example, 85° C. to 95° C.) of the engine cooling circuit differs from a coolant control temperature (for example, 35° C. to 50° C.) of the HEV cooling circuit, the engine cooling circuit is independent from the HEV cooling circuit.

In the HEV such as a hybrid bus using an automated manual transmission (AMT), a shift synchronizer is controlled by controlling torque of a motor. For this reason, since the shift synchronizer is not controlled when output of the motor is not performed, the HEV may not travel.

Thus, when the HEV system is overheated due to a lack of coolant in the HEV cooling circuit in the related art, output of the drive motor and the inverter is restricted or inhibited, thereby causing the synchronizer of the AMT to be not controlled so that the HEV may not travel.

RELATED ART DOCUMENT

Patent Document (Patent Document 1) Korean Patent Laid-Open Publication No. 10-1999-0062085 (Jul. 26, 1999)

SUMMARY

An embodiment of the present invention is directed to an HEV cooling system and a method of controlling the same, capable of suppressing overheating of an HEV system by supplying coolant from an engine cooling circuit to an HEV cooling circuit when coolant is insufficient in the HEV system.

Other objects and advantages of the present invention can be understood by the following description, and become apparent with reference to the embodiments of the present invention. The objects and advantages of embodiments of the present invention can be realized by the means as claimed and combinations thereof. In accordance with an embodiment of the present invention, an HEV cooling system includes an engine cooling circuit configured to cool coolant through an engine heat exchanger and cool an engine by circulation of the coolant cooled by the engine heat exchanger using an engine water pump, the engine cooling circuit having an engine reservoir tank configured to temporarily store the coolant cooled by the engine heat exchanger and replenish insufficient coolant. An HEV cooling circuit may be configured to cool coolant through an HEV heat exchanger and cool an inverter and a motor by circulation of the coolant cooled by the HEV heat exchanger using an HEV water pump, the HEV cooling circuit having an HEV reservoir tank configured to temporarily store the coolant cooled by the HEV heat exchanger and replenish insufficient coolant. A connector may be configured to intermittently connect the engine cooling circuit to the HEV cooling circuit. An engine coolant amount detection sensor may be configured to detect an amount of the coolant stored in the engine reservoir tank. An HEV coolant amount detection sensor may be configured to detect an amount of the coolant stored in the HEV reservoir tank.

In certain embodiments, the connector may include a check valve configured to prevent the coolant from flowing backward to the engine cooling circuit from the HEV cooling circuit.

In certain embodiments, the connector may connect a front end of the engine to a front end of the inverter.

In certain embodiments, the connector may include an electric opening valve configured to open and close the connector.

In certain embodiments, at least one of the engine coolant amount detection sensor and the HEV coolant amount detection sensor may be a level sensor configured to detect a level of the stored coolant.

In certain embodiments, the HEV cooling system may include an HCU configured to receive data from the engine coolant amount detection sensor regarding the amount of the coolant stored in the engine reservoir tank and data from the HEV coolant amount detection sensor regarding the amount of coolant stored in the HEV reservoir tank and control whether or not to open and close the electric opening valve. In certain embodiments, the HCU may be further configured to receive data from a motor temperature sensor, an inverter temperature sensor, an engine coolant temperature sensor, or an HEV coolant temperature sensor.

In accordance with another embodiment of the present invention, a method of controlling an HEV cooling system includes determining whether an HEV engine is in a started state or in a key-on state, an HEV coolant amount determination step of determining whether or not an amount of HEV coolant stored in an HEV reservoir tank is less than a first reference value, an engine coolant amount determination step of, when the amount of HEV coolant stored in the HEV reservoir tank is determined to be less than the first reference value, determining whether or not an amount of engine coolant stored in an engine reservoir tank is equal to or greater than a second reference value, and, a valve opening step of opening an electric opening valve configured to open and close a connector connecting an engine cooling circuit to an HEV cooling circuit. The method may also include determining whether or not the starting of the HEV engine is turned off after the valve opening step, when the starting of the HEV engine is determined to be turned off after the valve opening step, closing the electric opening valve.

In certain embodiments, the method may further include closing the electric opening valve when the amount of the HEV coolant is determined to be equal to or greater than the first reference value in the HEV coolant amount determination step or when the amount of the engine coolant is determined to be less than the second reference value in the engine coolant amount determination step.

In certain embodiments, the method may further include an engine coolant temperature determination step of determining whether or not a temperature of the engine coolant exceeds a first temperature when the amount of the engine coolant is determined to be equal to or greater than the second reference value in the performing engine coolant amount determination step, and closing the electric opening valve when the temperature of the engine coolant is determined to exceed the first temperature.

In certain embodiments, the method may further include determining, when the temperature of the engine coolant is determined to be equal to or less than the first temperature in the engine coolant temperature determination step, whether or not the temperature of the engine coolant is equal to or less than a second temperature, and an engine coolant temperature control step of reducing power of the engine and maximally operating a cooling fan mounted to an engine heat exchanger to control the temperature of the engine coolant when the temperature of the engine coolant is determined to exceed the second temperature.

BRIEF DESCRIPTION OF THE DRAWINGS

FIG. 2 is a flowchart illustrating a method of controlling an HEV cooling system according to an embodiment of the present invention.

DETAILED DESCRIPTION

Figure 1A:
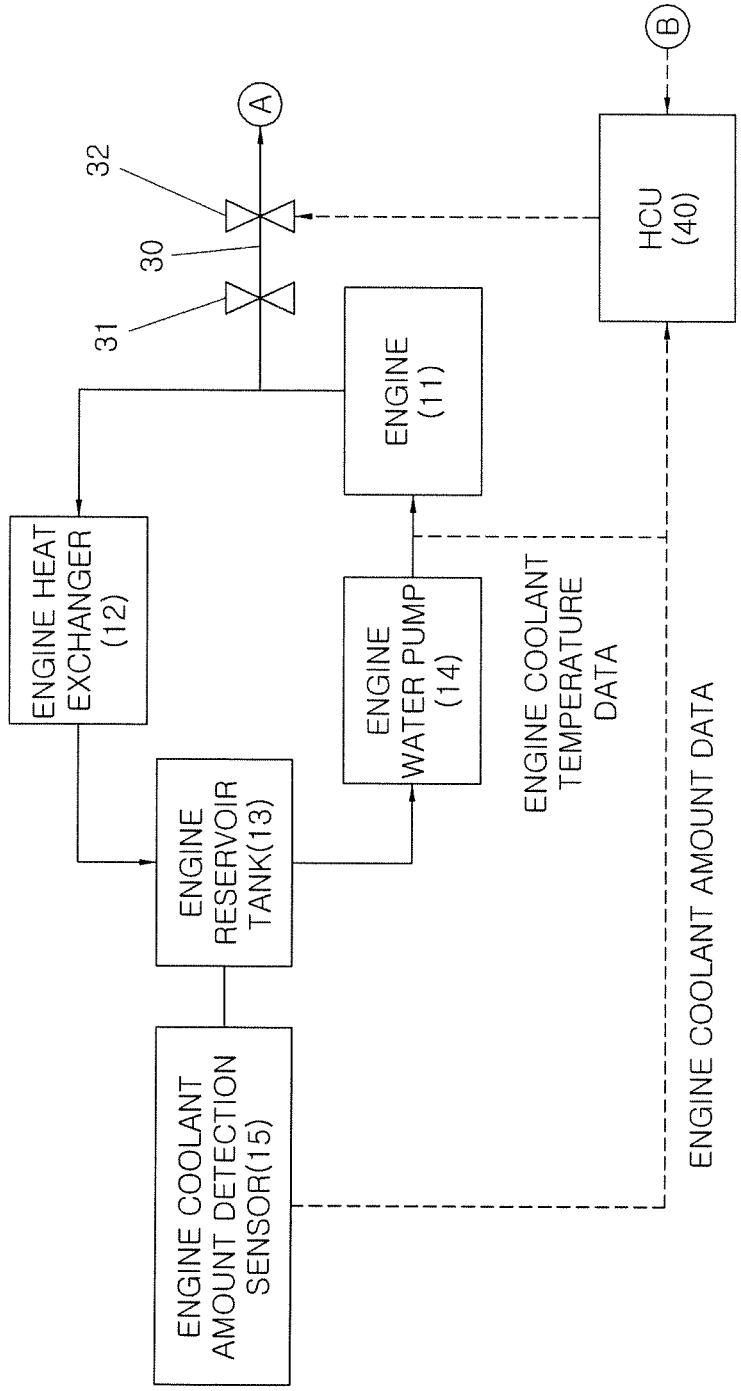
FIG. 1A and FIG. 1B are block diagrams illustrating portions of an HEV cooling system according to an embodiment of the present invention.

The terms and words used in the specification and claims should not be construed as their ordinary or dictionary sense. On the basis of the principle that the inventor can define the appropriate concept of a term in order to describe his/her own invention in the best way, it should be construed as meaning and concepts for complying with the technical ideas of embodiments the present invention. Accordingly, the embodiments described in the present specification and the construction shown in the drawings do not cover all the technical ideas of the invention. Thus, it should be understood that various changes and modifications may be made at the time of filing the present application. In addition, detailed descriptions of functions and constructions well known in the art may be omitted to avoid unnecessarily obscuring the gist of embodiments of the present invention. Exemplary embodiments of the present invention will be described below in more detail with reference to the accompanying drawings.

Figure 1B:
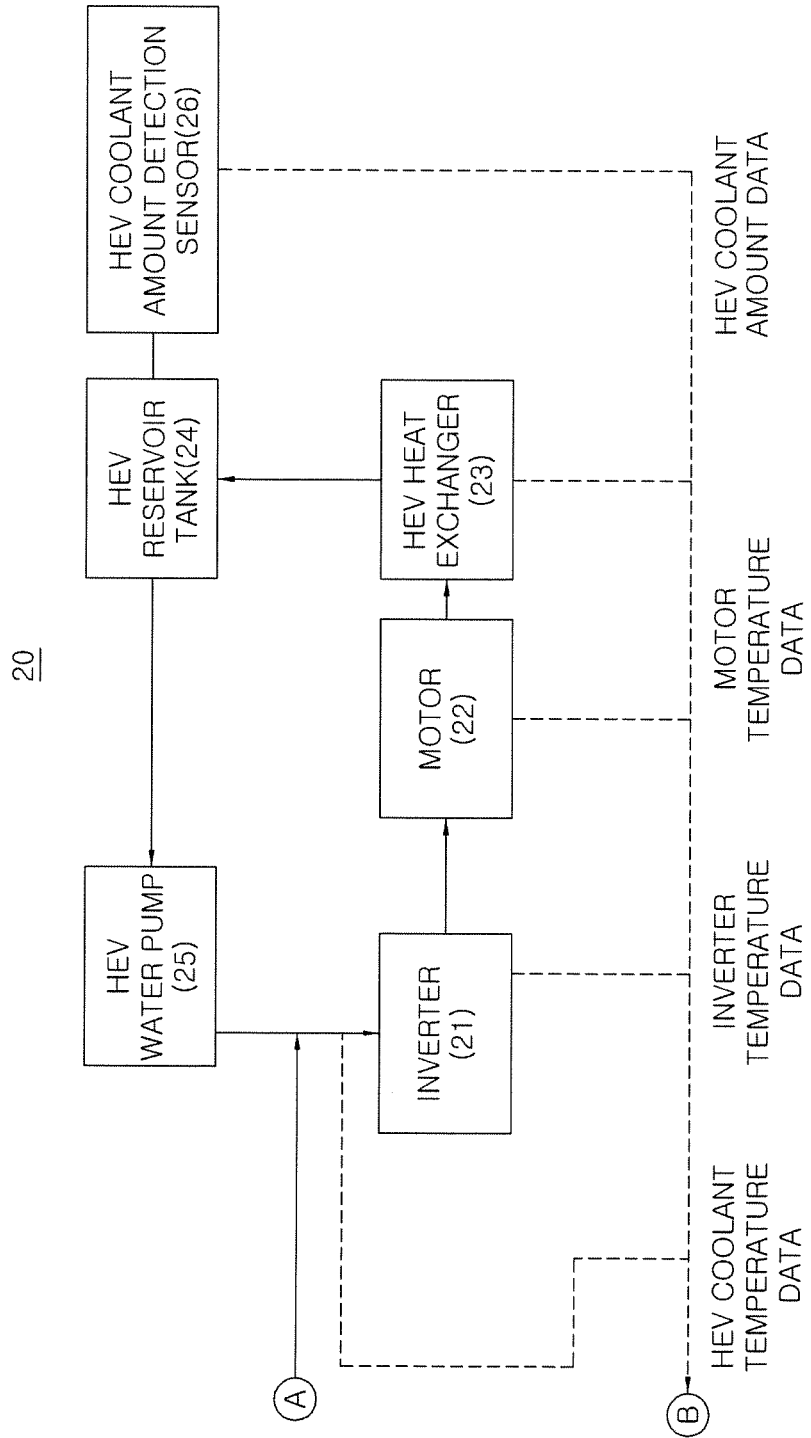

FIG. 1A and FIG. 1B are block diagrams illustrating an HEV cooling system according to an embodiment of the present invention. Referring to FIG. 1A and FIG. 1B, the HEV cooling system according to an embodiment of the present invention includes an engine cooling circuit 10, an HEV cooling circuit 20, a connector 30. In certain embodiments, the HEV cooling system may also include a Hybrid Control Unit (HCU) 40.

The engine cooling circuit 10 serves to cool coolant through an engine heat exchanger 12 and circulate the cooled coolant using an engine water pump 14, so as to cool an engine 11.

The engine cooling circuit 10 includes an engine reservoir tank 13 for temporarily storing the coolant cooled by the engine heat exchanger 12 and replenishing insufficient coolant through a circulation passage of the engine cooling circuit 10.

The engine reservoir tank 13 includes an engine coolant amount detection sensor 15 capable of detecting an amount of coolant stored in the engine reservoir tank 13. It may be determined whether or not an amount of coolant in the engine cooling circuit 10 is insufficient by detecting the amount of the coolant stored in the engine reservoir tank 13 through the coolant amount detection sensor 15. In certain embodiments, the engine coolant amount detection sensor 15 may be a level sensor which detects a level of the coolant in the engine reservoir tank 13.

The HEV cooling circuit 20 serves to cool coolant through an HEV heat exchanger 23 and circulate the cooled coolant using an HEV water pump 25, so as to cool an inverter 21 and a motor 22.

The HEV cooling circuit 20 includes an HEV reservoir tank 24 for temporarily storing the coolant cooled by the HEV heat exchanger 23 and replenishing insufficient coolant through a circulation passage of the HEV cooling circuit 20.

The HEV reservoir tank 24 includes an HEV coolant amount detection sensor 26 capable of detecting an amount of coolant stored in the HEV reservoir tank 24. It may be determined whether or not an amount of coolant in the HEV cooling circuit 20 is insufficient by detecting the amount of the coolant stored in the HEV reservoir tank 24 through the HEV coolant amount detection sensor 26. In certain embodiments, the HEV coolant amount detection sensor 26 may be a level sensor which detects a level of the coolant in the HEV reservoir tank 24.

The connector 30 serves to intermittently connect the engine cooling circuit 10 to the HEV cooling circuit 20. In certain embodiments, the connector 30 may connect a front end of the engine 11 to a front end of the inverter 21. This enables the inverter 21 and the motor 22 to be efficiently cooled by introducing the cooled coolant into the inverter 21 before introduction to the engine 11. However, the connector 30 is not limited to be connected to the front end of the engine 11 and the front end of the inverter 21, and may be connected to various positions according to design.

In certain embodiments, the connector 30 may include a check valve 31 which prevents the coolant from flowing backward to the engine cooling circuit 10 from the HEV cooling circuit 20. In these embodiments, the coolant may be introduced only in the direction from the engine cooling circuit 10 to the HEV cooling circuit 20 by the check valve 31. Through such a configuration, an operation of an HEV may be prevented from stopping due to overheating of the inverter 21 or the motor 22 caused by a lack of the coolant in the HEV cooling circuit 20 by the back flow of the coolant from the HEV cooling circuit 20 to the engine cooling circuit

10 since the amount of the coolant in the HEV cooling circuit 20 is smaller than the amount of the coolant of the engine cooling circuit 10.

In certain embodiments, the connector 30 may include an electric opening valve 32 which opens and closes the connector 30. In these embodiments, the coolant in the engine cooling circuit 10 is introduced into the HEV cooling circuit 20 when the electric opening valve 32 is opened, and the coolant in the engine cooling circuit 10 is blocked from being introduced into the HEV cooling circuit 20 when the electric opening valve 32 is closed.

Accordingly, the operation of the HEV may be prevented from stopping due to overheating of the inverter 21 or the motor 22, by rapidly supplying the coolant in the engine cooling circuit 10 to the HEV cooling circuit 20 by opening the electric opening valve 32 when the coolant in the HEV cooling circuit 20 is insufficient.

In certain embodiments, the HCU 40 receives information regarding the amounts of the coolant in the engine cooling circuit 10 and the HEV cooling circuit 20 from the HEV coolant amount detection sensor 26 and the engine coolant amount detection sensor 15, and determines whether or not the amounts of the coolant are insufficient. Through such determination, the HCU may control whether or not to open and close the electric opening valve 32. In certain embodiments, the HCU may further receive information from one or more of a motor temperature sensor, an inverter temperature sensor, an engine coolant temperature sensor, and an HEV coolant temperature sensor and control whether or not to open and close the electric opening valve 32, as described below.

FIG. 2 is a flowchart illustrating a method of controlling an HEV cooling system according to an embodiment of the present invention. Referring to FIG. 2, the method of controlling an HEV cooling system according to an embodiment of the present invention includes an engine starting determination step S100, an HEV coolant amount determination step S200, an engine coolant amount determination step S300, a valve opening step S400, a starting determination step S500, and a first valve closing step S600.

The engine starting determination step S100 is a step of determining whether an engine is in a started state or in a key-on state. Since an HEV system is not overheated in a state in which the engine is not started, there is no need to perform control steps of a cooling system to be described later. However, when the engine is determined to be started, there is a possibility of the HEV system being overheated due to a lack of coolant. Therefore, the method includes determining whether or not coolant in an HEV cooling circuit 20 is insufficient and performs control of supplying coolant from an engine cooling circuit 10 to the HEV cooling circuit 20 according to the determination result, as described below.

When the engine is determined to be started in the engine starting determination step S100, it is determined whether or not an amount of HEV coolant stored in an HEV reservoir tank 24 is less than a first reference value $V_1$ in the HEV coolant amount determination step S200. When the amount of the HEV coolant is determined to be less than the first reference value $V_1$, it is predicted that an amount of coolant for cooling the HEV system is insufficient and thus a motor 22 or an inverter 21 may be overheated. Here, the first reference value $V_1$ may be differently set according to the HEV cooling circuit.

When the amount of the HEV coolant stored in the HEV reservoir tank 24 is determined to be less than the first reference value $V_1$ and the coolant is determined to be insufficient in the HEV coolant amount determination step S200, it is determined whether or not an amount of engine coolant stored in an engine reservoir tank 13 is equal to or greater than a second reference value $V_2$ in the engine coolant amount determination step S300.

When the amount of the engine coolant stored in the engine reservoir tank 13 is equal to or greater than the second reference value $V_2$, it is determined that an amount of coolant circulated in the engine cooling circuit 10 is enough to replenish coolant to the HEV cooling circuit 20. Thus, an electric opening valve 32 for opening and closing a connector 30 which connects the engine cooling circuit 10 to the HEV cooling circuit 20 is opened in a valve opening step S400. Through such a manner, the coolant may be introduced from the engine cooling circuit 10 to the HEY cooling circuit 20 so that the coolant circulated in the HEV cooling circuit 20 may be replenished.

The engine coolant introduced into the HEV cooling circuit 20 serves to replenish an insufficient amount of coolant in the HEV cooling circuit 20 so as to efficiently cool the inverter 21 or the motor 22. Consequently, it may be possible to prevent a situation in which an HEV does not travel due to overheating of the HEV system, and thus the HEV may stably travel. In certain embodiments, it may be possible to prevent an operation of the HEV from stopping due to overheating of the inverter 21 or the motor 22 caused by a lack of coolant in the HEV cooling circuit by preventing the flow of coolant from the HEV cooling circuit 20 to the engine cooling circuit 10 using a check valve 31.

Meanwhile, when the amount of the engine coolant stored in the engine reservoir tank 13 is less than the second reference value $V_2$, it is determined that the amount of the engine coolant is not enough to replenish coolant to the HEV cooling circuit 20. Thus, a second electric opening valve closing step S700 controls the electric opening valve 32 such that the electric opening valve 32 for opening and closing the connector 30 which connects the engine cooling circuit 10 to the HEV cooling circuit 20 is closed.

The starting determination step S500 determines whether or not the starting of the HEV is turned off after the valve opening step S400. When it is determined that the starting of the HEV is turned off in the starting determination step S500, a first valve closing step S600 controls the electric opening valve 32 such that the electric opening valve 32 is closed. Since the HEV system is unlikely to be overheated when the starting of the HEV is turned off, the electric opening valve 32 is closed to restore the cooling system of the HEV to a normal state. When it is determined that the starting of the HEV is not turned off after the valve opening step S400 in the starting determination step S500, the HEV coolant amount determination step S200 is performed again so as to determine whether or not the amount of the coolant is insufficient in the HEV system.

Figure 3A:
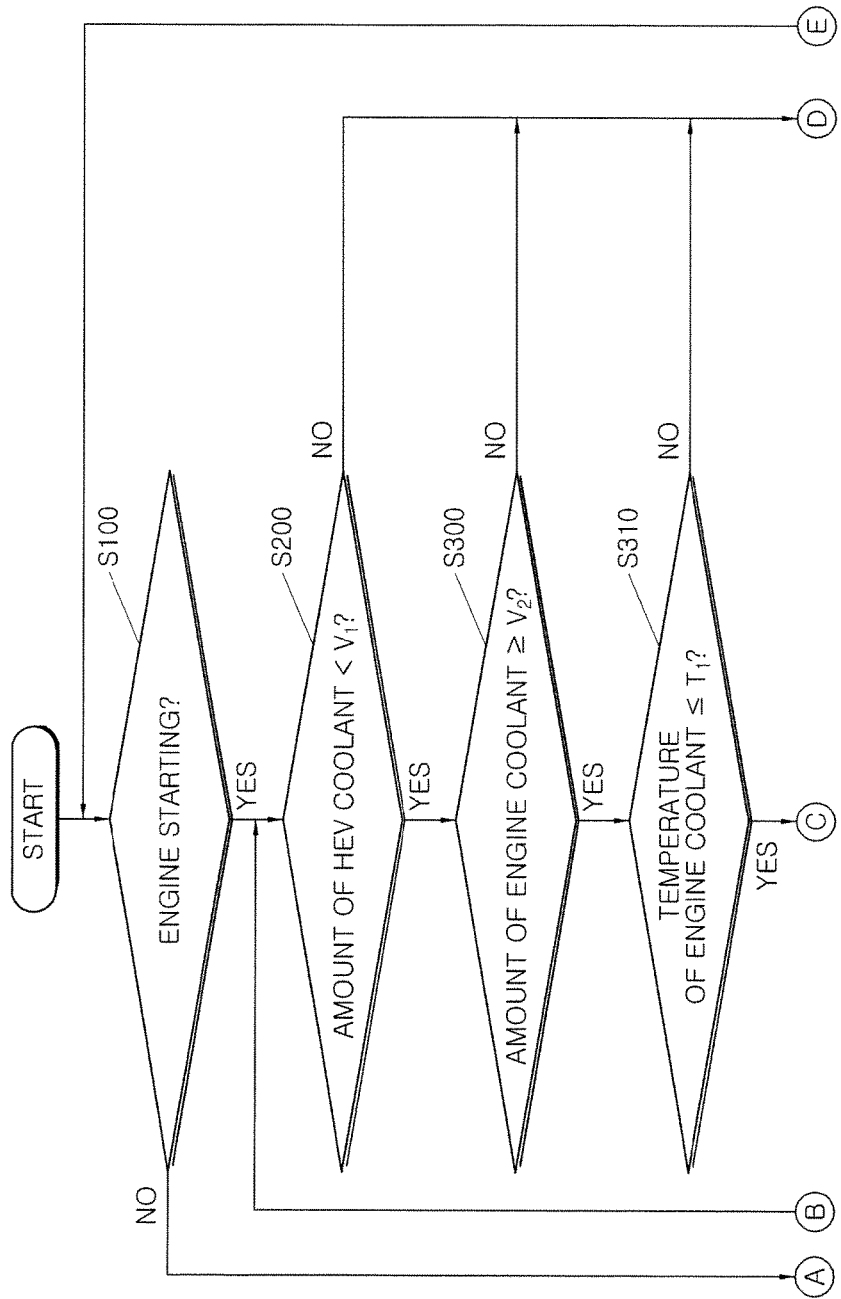
FIG. 3A and FIG. 3B illustrate a flowchart of a method of controlling an HEV cooling system according to another embodiment of the present invention.
Figure 3B:
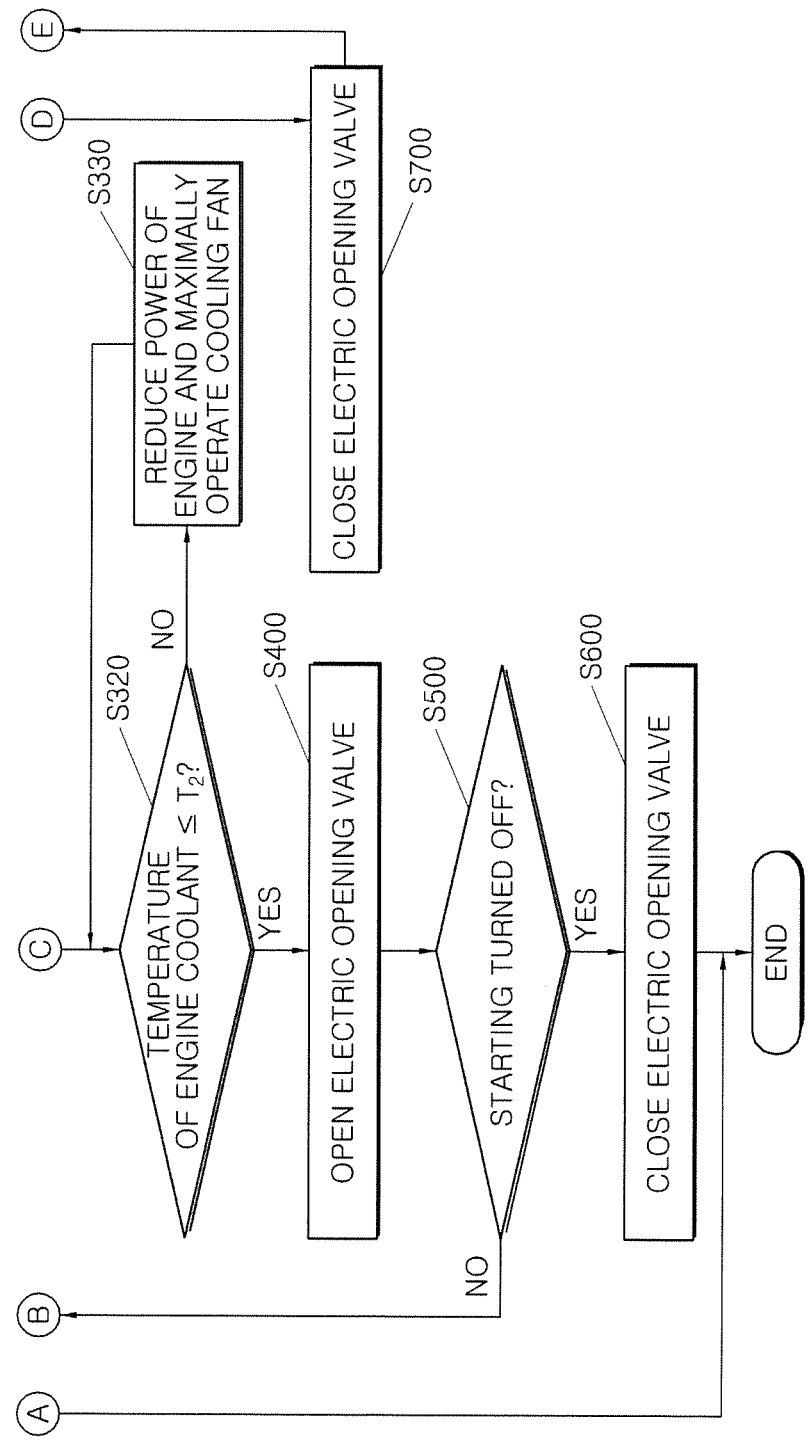

FIG. 3A and FIG. 3B illustrate a flowchart of a method of controlling an HEV cooling system according to another embodiment of the present invention. FIG. 3A and FIG. 3B show a case of adding further control to the prevention of overheating of an engine or an HEV system by replenishing coolant in the HEV cooling system described previously according to the embodiment of FIG. 2. The redundant control steps previously described with reference to FIG. 2 will be omitted below, and added control steps in FIG. 3A and FIG. 3B will be described in detail.

The method of controlling an HEV cooling system in FIG. 3A and FIG. 3B further includes steps of determining whether or not to open and close the electric opening valve 32 according to a temperature of engine coolant, in addition to the method of controlling an HEV cooling system in FIG. 2.

Specifically, when the amount of the engine coolant stored in the engine reservoir tank 13 is determined to be equal to or greater than the second reference value $V_2$ in the engine coolant amount determination step S300, a first engine coolant temperature determination step S310 of determining whether or not a temperature of the engine coolant exceeds a first temperature $T_1$ is performed prior to opening of the electric opening valve 32.

This first temperature determination step S310 is to check the temperature of the engine coolant before the coolant in the engine cooling circuit is introduced into the HEV cooling circuit since a coolant control temperature (for example, 85° C. to 95° C.) of the engine cooling circuit 10 differs from a coolant control temperature (for example, 35° C. to 50° C.) of the HEV cooling circuit 20. When the temperature of the engine coolant exceeds the first temperature $T_1$, it is determined that the temperature is outside a range of the coolant control temperature of the engine cooling circuit and thus the engine is overheated. In certain embodiments, the first temperature $T_1$ may be set as, for example, 95° C., but is not limited thereto. The first temperature $T_1$ may be differently set according to the engine cooling circuit.

When the temperature of the engine coolant is determined to exceed the first temperature $T_1$, it is determined that the engine cooling circuit 10 is abnormal. Thus, the second valve closing step S700 of controlling the electric opening valve 32 such that the electric opening valve 32 is closed so as not to supply the engine coolant to the HEV cooling circuit 20 is performed.

When the amount of the engine coolant stored in the engine reservoir tank 13 is determined to be less than the second reference value $V_2$ in the engine coolant amount determination step S300, a second temperature determination step S320 of determining whether or not a temperature of the engine coolant is equal to or less than a second temperature $T_2$ is performed. This second temperature determination step S320 is to check the temperature of the engine coolant before the coolant in the engine cooling circuit is introduced into the HEV cooling circuit and to determine whether or not to perform the temperature control of the engine coolant since the coolant control temperature (for example, 85° C. to 95° C.) of the engine cooling circuit 10 differs from the coolant control temperature (for example, 35° C. to 50° C.) of the HEV cooling circuit 20. In certain embodiments, the second temperature $T_2$ may be set as, for example, 50° C., but is not limited thereto. The second temperature $T_2$ may be differently set according to the HEV cooling circuit.

When the temperature of the engine coolant is determined to be equal to or less than the second temperature $T_2$, the engine coolant is in a range of the coolant control temperature of the HEV cooling circuit. Thus, the electric opening valve 32 is opened with no need of controlling the temperature of the engine coolant S400.

When the temperature of the engine coolant is determined to exceed the second temperature $T_2$, an engine coolant temperature control step S330 of reducing power of the engine and maximally operating a cooling fan mounted to an engine heat exchanger to cool the engine coolant is performed. As described above, this step is to decrease the temperature of the engine coolant before the coolant in the engine cooling circuit is introduced into the HEV cooling circuit since the coolant control temperature (for example, 85° C. to 95° C.) of the engine cooling circuit 10 differs from the coolant control temperature (for example, 35° C. to 50° C.) of the HEV cooling circuit 20. After the engine coolant temperature control step S330 is performed to decrease the temperature of the engine coolant, the second temperature determination step S320 is performed again to determine whether the temperature of the engine coolant reaches the second temperature $T_2$.

In accordance with the exemplary embodiments of the present invention, it may be possible to suppress overheating of an HEV system by supplying coolant in an engine cooling circuit to an HEV cooling circuit when coolant is insufficient in the HEV system. Consequently, it may be possible to prevent a situation in which an HEV is not able to travel, and thus the HEV may stably travel.

In addition, in certain embodiments, it may be possible to prevent an operation of the HEV from stopping due to a lack of coolant in the HEV cooling circuit by preventing flow of coolant from the HEV cooling circuit to the engine cooling circuit using a check valve.

While the present invention has been described with respect to the specific embodiments, it will be apparent to those skilled in the art that various changes and modifications may be made without departing from the spirit and scope of the invention as defined in the following claims.

What is claimed is:

1. A hybrid electric vehicle (HEV) cooling system comprising:
   an engine cooling circuit configured to cool coolant through an engine heat exchanger and cool an engine by circulation of the coolant cooled by the engine heat exchanger using an engine water pump, the engine cooling circuit having an engine reservoir tank configured to temporarily store the coolant cooled by the engine heat exchanger and replenish insufficient coolant;
   an HEV cooling circuit configured to cool coolant through an HEV heat exchanger and cool an inverter and a motor by circulation of the coolant cooled by the HEV heat exchanger using an HEV water pump, the HEV cooling circuit having an HEV reservoir tank configured to temporarily store the coolant cooled by the HEV heat exchanger and replenish insufficient coolant;
   a connector configured to intermittently connect the engine cooling circuit to the HEV cooling circuit;
   an engine coolant amount detection sensor configured to detect an amount of the coolant stored in the engine reservoir tank;
   an HEV coolant amount detection sensor configured to detect an amount of the coolant stored in the HEV reservoir tank; and
   a hybrid control unit (HCU) configured to
      receive
         data from the engine coolant amount detection sensor regarding the amount of coolant stored in the engine reservoir tank and
         data from the HEV coolant amount detection sensor regarding the amount of coolant stored in the HEV reservoir tank and
      control whether or not to open and close an electric opening valve of the connector during an operation of the HEV.

2. The HEV cooling system of claim 1, wherein the connector comprises a check valve configured to prevent the coolant from flowing backward to the engine cooling circuit from the HEV cooling circuit.

3. The HEV cooling system of claim 1, wherein the connector connects a front end of the engine to a front end of the inverter.

4. The HEV cooling system of claim 1, wherein the connector comprises the electric opening valve configured to open and close the connector.

5. The HEV cooling system of claim 1, wherein at least one of the engine coolant amount detection sensor and the HEV coolant amount detection sensor is a level sensor configured to detect a level of stored coolant.

6. The HEV cooling system of claim 1, wherein the HCU is further configured to receive data from a motor temperature sensor, an inverter temperature sensor, an engine coolant temperature sensor, or an HEV coolant temperature sensor.

* * * * *